United States Patent
You et al.

(10) Patent No.: US 10,375,529 B2
(45) Date of Patent: Aug. 6, 2019

(54) TRANSMISSION/RECEPTION METHOD FOR MTC APPARATUS

(71) Applicant: LG ELECTRONICS INC., Seoul (KR)

(72) Inventors: Hyangsun You, Seoul (KR); Dongyoun Seo, Seoul (KR); Yunjung Yi, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/906,964

(22) PCT Filed: Jul. 3, 2014

(86) PCT No.: PCT/KR2014/005950
§ 371 (c)(1),
(2) Date: Jan. 22, 2016

(87) PCT Pub. No.: WO2015/012507
PCT Pub. Date: Jan. 29, 2015

(65) Prior Publication Data
US 2016/0174014 A1    Jun. 16, 2016

Related U.S. Application Data

(60) Provisional application No. 61/858,629, filed on Jul. 26, 2013, provisional application No. 61/866,551, filed on Aug. 16, 2013.

(51) Int. Cl.
*H04L 5/00*        (2006.01)
*H04W 4/06*        (2009.01)
(Continued)

(52) U.S. Cl.
CPC ............ *H04W 4/06* (2013.01); *H04B 7/2656* (2013.01); *H04L 5/005* (2013.01); *H04L 5/0092* (2013.01); *H04W 4/70* (2018.02); *H04W 72/005* (2013.01)

(58) Field of Classification Search
CPC . H04W 4/005; H04W 4/06–10; H04W 8/005; H04W 72/005; H04W 76/002; H04W 4/70
See application file for complete search history.

(56) References Cited

U.S. PATENT DOCUMENTS

2012/0155406 A1    6/2012  Kim et al.
2012/0300655 A1    11/2012 Lee et al.
(Continued)

FOREIGN PATENT DOCUMENTS

KR    10-2011-0093648 A    8/2011
KR    10-2012-0070443 A    6/2012
(Continued)

*Primary Examiner* — Marcus Smith
(74) *Attorney, Agent, or Firm* — Birch, Stewart, Kolasch & Birch, LLP

(57) ABSTRACT

The present specification discloses a transmission/reception method for a machine type communication (MTC) apparatus. The transmission/reception method for the MTC apparatus may comprise the steps of: receiving, by the MTC apparatus, setting information about a multicast-broadcast single-frequency network (MBSFN) subframe from a base station; receiving, by the MTC apparatus, downlink data for the MTC apparatus, on a data region of the MBSFN subframe; and receiving, by the MTC apparatus, a cell-specific reference signal (CRS) only on a portion of the resource blocks (RBs) in the whole system bandwidth of the data region in the MBSFN subframe. Here, the CRS received only on the portion of RBs may be transmitted while electric power is increased by means of the base station.

10 Claims, 18 Drawing Sheets

(51) Int. Cl.
*H04W 4/70* (2018.01)
*H04W 72/00* (2009.01)
*H04B 7/26* (2006.01)

(56) References Cited

U.S. PATENT DOCUMENTS

| | | | |
|---|---|---|---|
| 2012/0327895 A1* | 12/2012 | Wallen | H04W 48/12 |
| | | | 370/330 |
| 2013/0114498 A1 | 5/2013 | Park et al. | |
| 2013/0176995 A1 | 7/2013 | Park et al. | |
| 2013/0223323 A1* | 8/2013 | Jang | H04W 52/0216 |
| | | | 370/312 |
| 2014/0226638 A1* | 8/2014 | Xu | H04W 48/12 |
| | | | 370/336 |
| 2014/0376509 A1* | 12/2014 | Young | H04L 5/0037 |
| | | | 370/330 |
| 2015/0257184 A1* | 9/2015 | Yamazaki | H04W 76/023 |
| | | | 370/329 |
| 2017/0164340 A1* | 6/2017 | Xu | H04W 72/042 |

FOREIGN PATENT DOCUMENTS

| | | |
|---|---|---|
| WO | WO 2012/005494 A2 | 1/2012 |
| WO | WO 2013/063780 A1 | 5/2013 |

\* cited by examiner (b) MULTIPLE CCS (a) SINGLE CC

TRANSMISSION/RECEPTION METHOD FOR MTC APPARATUS

CROSS REFERENCE TO RELATED APPLICATIONS

This application is the National Phase of PCT International Application No. PCT/KR2014/005950, filed on Jul. 3, 2014, which claims priority under 35 U.S.C. 119(e) to U.S. Provisional Application No. 61/858,629, filed on Jul. 26, 2013, and to U.S. Provisional Application No. 61/866,551, filed on Aug. 16, 2013, all of which are hereby expressly incorporated by reference into the present application.

FIELD OF THE INVENTION

The present invention relates to mobile communication.

RELATED ART

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36. 211 V10. 4. 0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

Recently, it is considered to extend cell coverage of a BS for an MTC apparatus, and various schemes for extending the cell coverage are under discussion. However, when the cell coverage is extended, if the BS transmits a channel to the MTC apparatus located in the coverage extension region as if transmitting a channel to a normal UE, the MTC apparatus has a difficulty in receiving the channel.

Further, as the MTC apparatus is expected to have low performance in order to supply more MTC apparatuses at a low price, if the BS transmits a PDCCH or a PDSCH to the MTC apparatus located in the coverage extension region as if transmitting a PDCCH or a PDSCH to a normal UE, the MTC apparatus has a difficulty in receiving the PDCCH or the PDSCH.

SUMMARY OF THE INVENTION

Accordingly, the disclosure of the specification has been made in an effort to solve the problem.

To achieve the foregoing purpose, when a machine-type (MTC) apparatus is located in a coverage extension region of a base station (BS), the BS may repeatedly transmit PDCCHs or PDSCHs (that is, transmit a bundle of PDCCHs or PDSCHs) on a plurality of subframes.

However, to repeatedly transmit PDCCHs to the MTC apparatus located in the coverage extension region on a plurality of subframes in the presence of an existing UE in a cell, a very large quantity of resources may be used, causing damage to the existing UE.

To solve such a problem, an embodiment of the present invention provides a transmission and reception method performed by a machine-type communication (MTC) apparatus. The method may comprise: receiving, by the MTC apparatus, configuration information on a multicast-broadcast single-frequency network (MBSFN) subframe from a base station; receiving, by the MTC apparatus, downlink data for the MTC apparatus on a data region of the MBSFN subframe; and receiving, by the MTC apparatus, a cell-specific reference signal (CRS) only on a portion of resource blocks (RBs) of an entire system bandwidth in the data region of the MBSFN subframe. The CRS received only on the portion of RBs is transmitted while electric power is increased by the base station.

The method may further comprise: recognizing, by the MTC apparatus, the MBSFN subframe as a subframe dedicated for MTC.

The method may further comprise: receiving, by the MTC apparatus, a physical downlink control channel (PDCCH) comprising scheduling information of the downlink data for the MTC apparatus on a control region of the MBSFN subframe.

The method may further comprise: receiving, by the MTC apparatus, the downlink data for the MTC apparatus also in a data region of a general subframe other than the MBSFN subframe.

To solve the foregoing problem, an embodiment of the present invention provides a transmission and reception method performed by a base station. The method may comprise: transmitting, by the base station, configuration information on a multicast-broadcast single-frequency network (MBSFN) subframe; scheduling, by the base station, a radio resource for a general user equipment on a general subframe other than the MBSFN subframe, and scheduling a radio resource for a machine-type communication (MTC) apparatus on the general subframe and the MBSFN subframe; transmitting, by the base station, a cell-specific reference signal (CRS) on an entire system bandwidth in a control region of the MBSFN subframe, and transmitting a CRS only on a portion of resource blocks (RBs) of an entire system bandwidth in a data region. The CRS on the portion of RBs is transmitted while electric power is increased.

The method may further comprise: transmitting, by the base station, downlink control information comprising scheduling information on downlink data for the MTC apparatus on the control region of the MBSFN subframe; and transmitting, by the base station, the downlink data for the MTC apparatus on the data region of the MBSFN subframe.

Further, to solve the foregoing problem, an embodiment of the present invention provides a machine-type communication (MTC) apparatus. The MTC apparatus may comprise: a processor; a transceiver controlled by the processor to receive configuration information on a multicast-broadcast single-frequency network (MBSFN) subframe from a base station, to receive downlink data for the MTC apparatus on a data region of the MBSFN subframe according to the configuration information, and to receive a cell-specific reference signal (CRS) only on a portion of resource blocks (RBs) of an entire system bandwidth in the data region of the MBSFN subframe. The CRS received only on the portion of RBs is transmitted while electric power is increased by the base station.

In addition, to solve the foregoing problem, an embodiment of the present invention provides a base station. The base station may comprise: a transceiver to transmit configuration information on a multicast-broadcast single-frequency network (MBSFN) subframe; and a processor to schedule a radio resource for a general user equipment on a general subframe other than the MBSFN subframe, and to schedule a radio resource for a machine-type communication (MTC) apparatus on the general subframe and the MBSFN subframe. The transceiver transmits a cell-specific reference signal (CRS) on an entire system bandwidth in a control region of the MBSFN subframe, and transmits a CRS only on a portion of resource blocks (RBs) of an entire system bandwidth in a data region, transmitting the CRS on the portion of RBs while electric power is increased.

According to the disclosure of the present specification, the problem of the foregoing conventional technology is solved. More specifically, according to the disclosure of the present specification, the reception performance and decoding performance of a machine-type communication (MTC) apparatus located in a coverage extension region of a base station may be improved.

DESCRIPTION OF EXEMPLARY EMBODIMENTS

Figure 1:
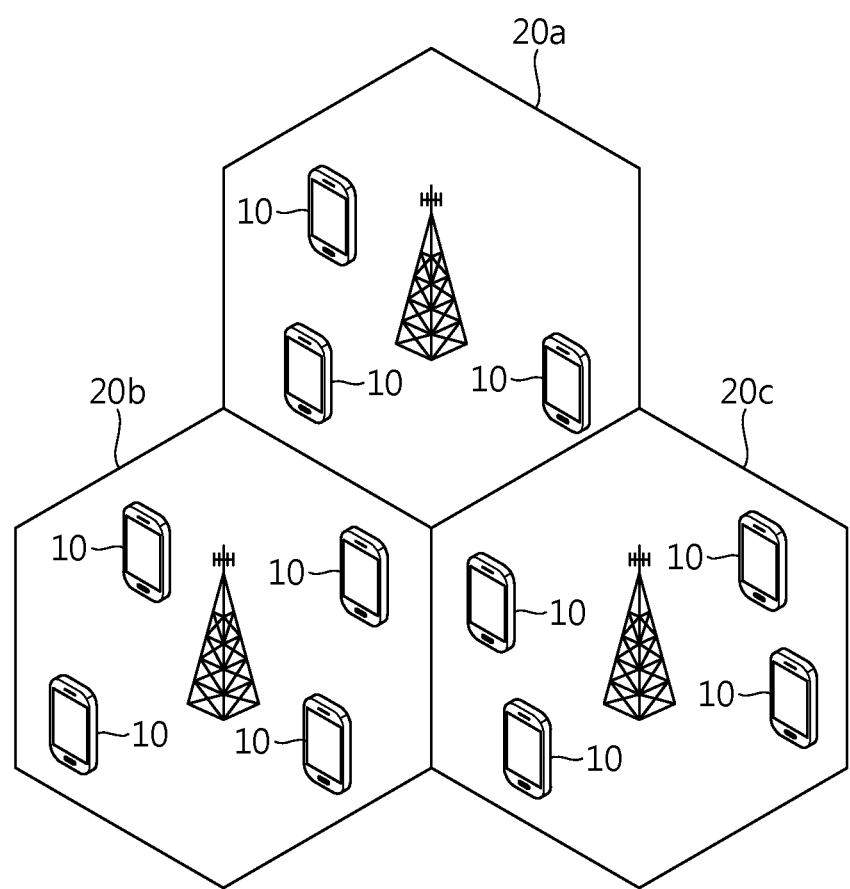
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
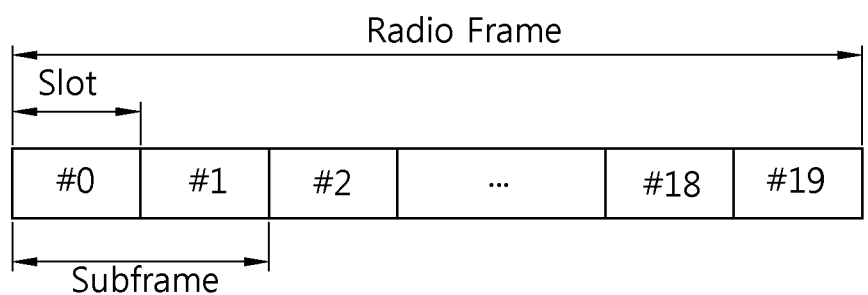
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36. 211 V10. 4. 0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
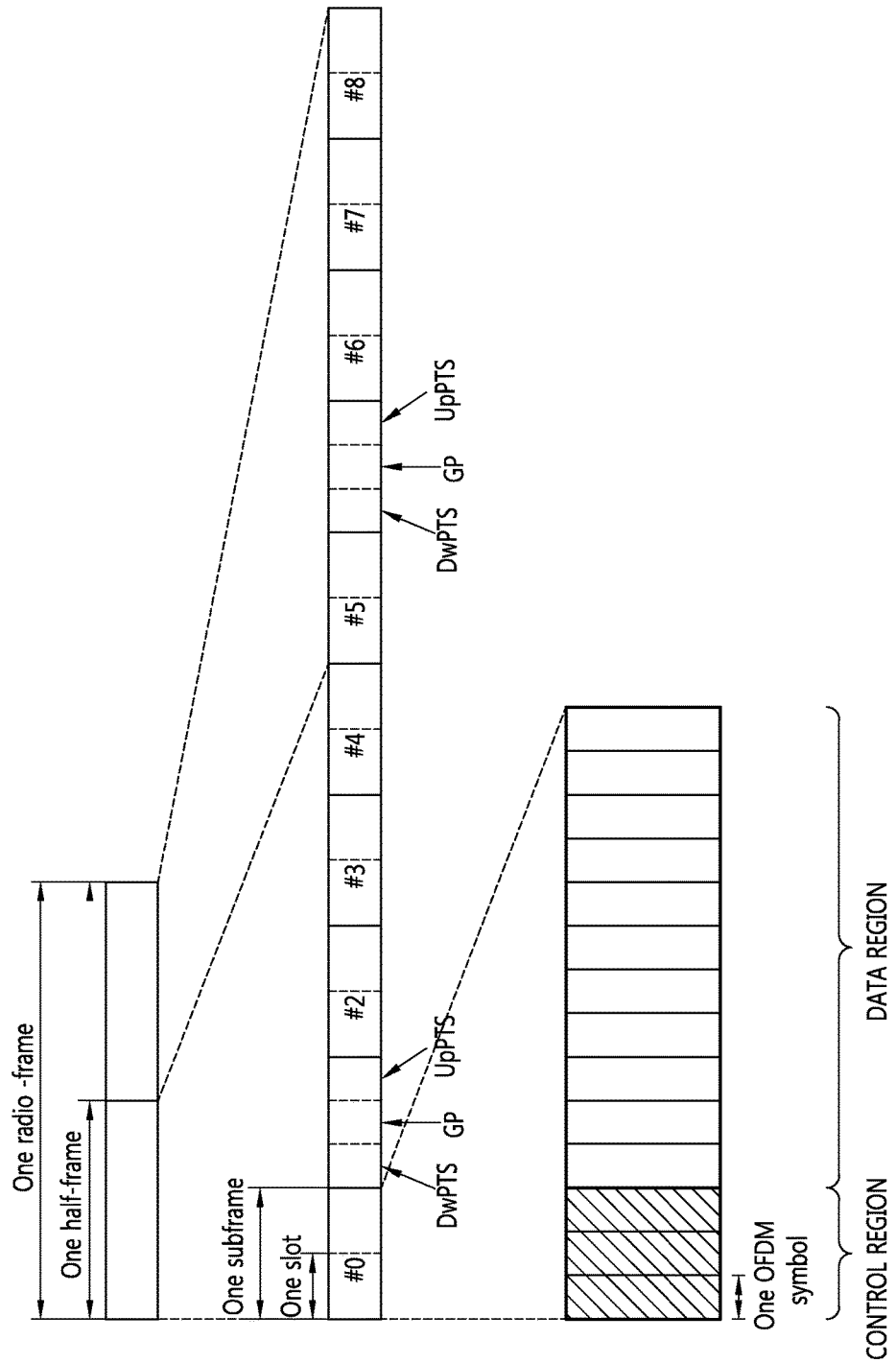
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36. 211 V10. 4. 0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36. 211 V8. 7. 0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Con-figuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
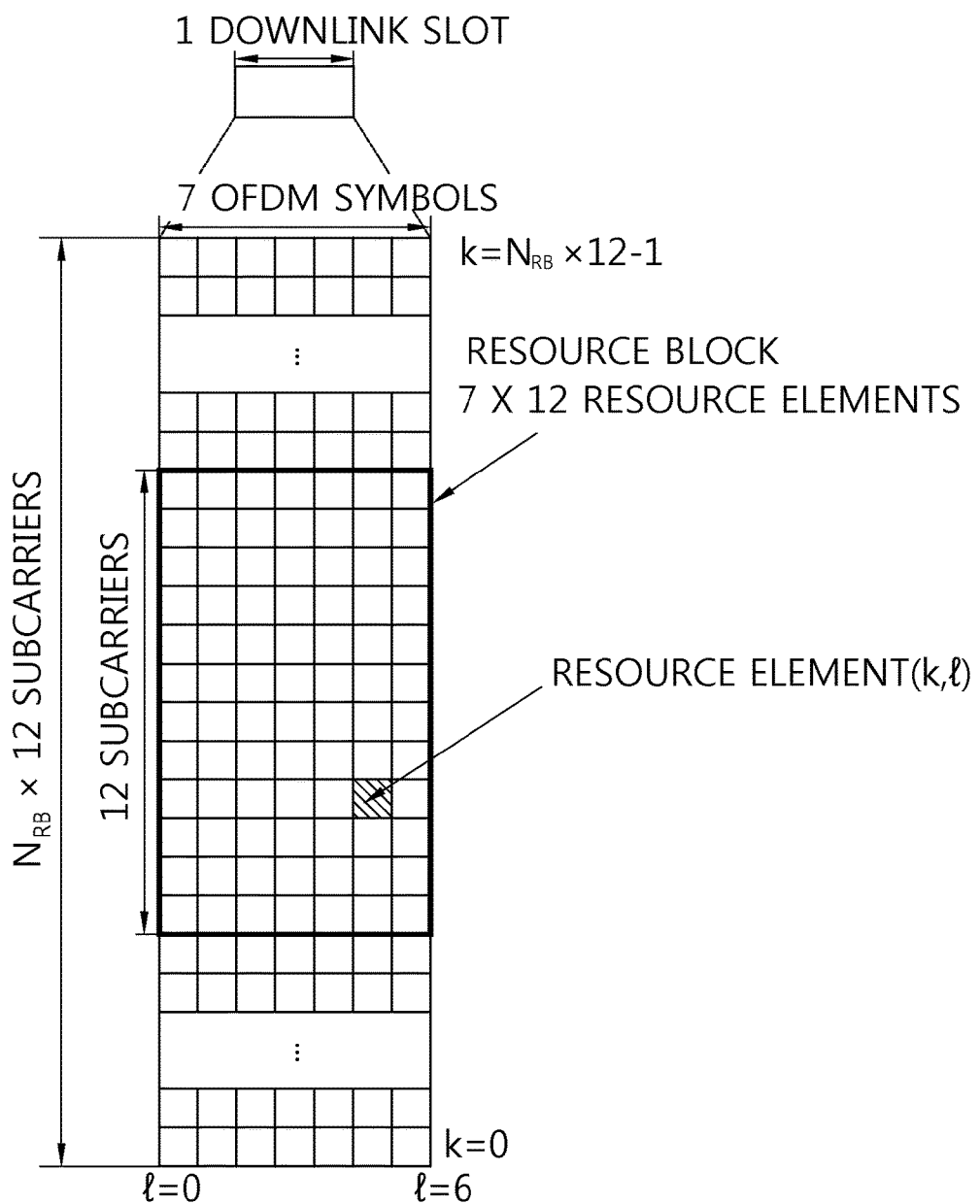
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
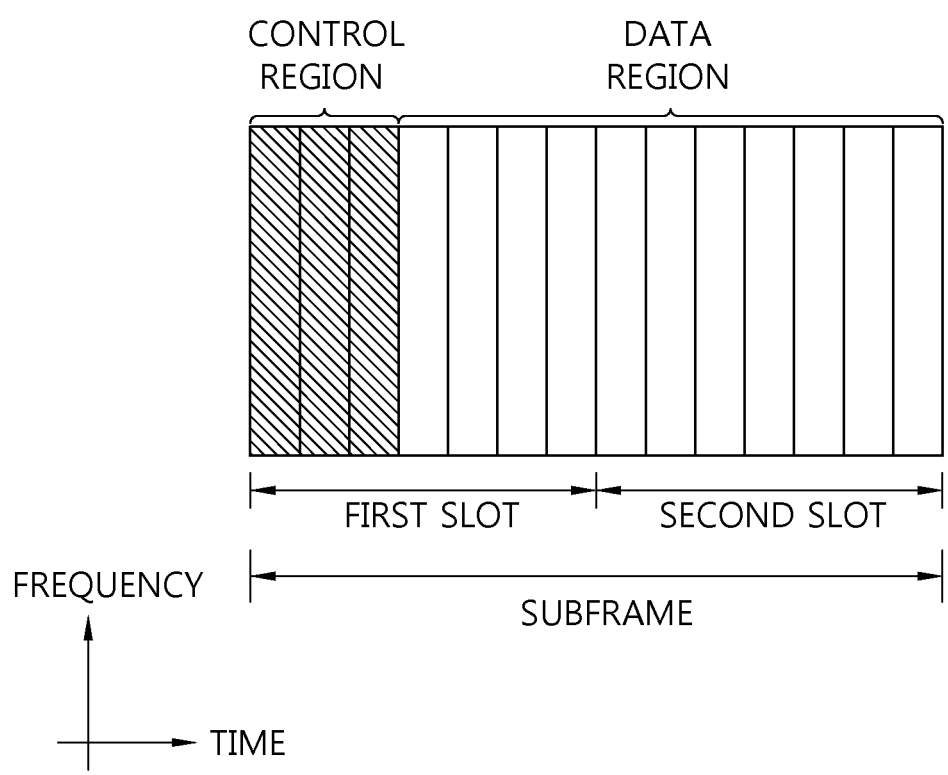
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36. 211 V10. 4. 0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
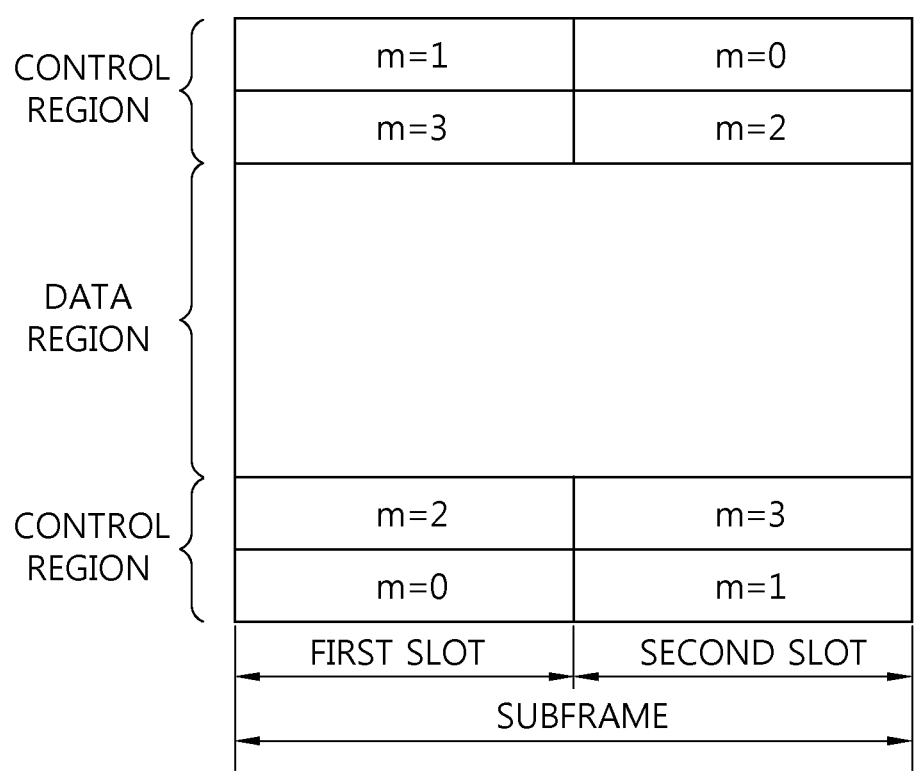
FIG. 6 illustrates the architecture of an uplink subframe in 3GPP LTE.
Figure 6:
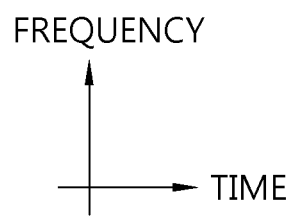

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
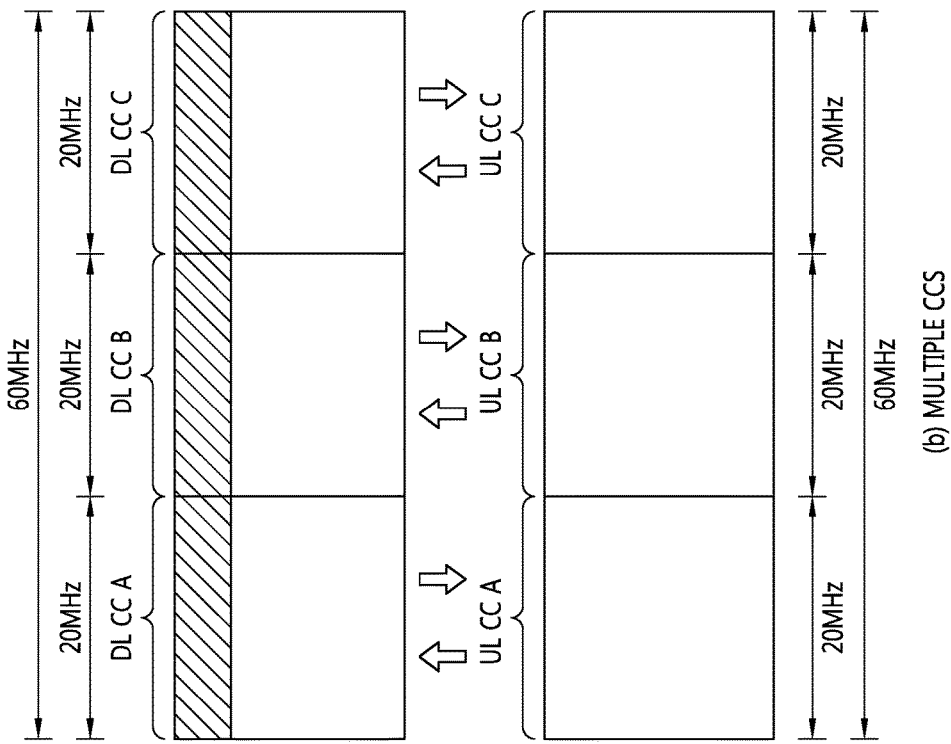
FIG. 7 illustrates an example of comparison between a single carrier system and a carrier aggregation system.
Figure 7:
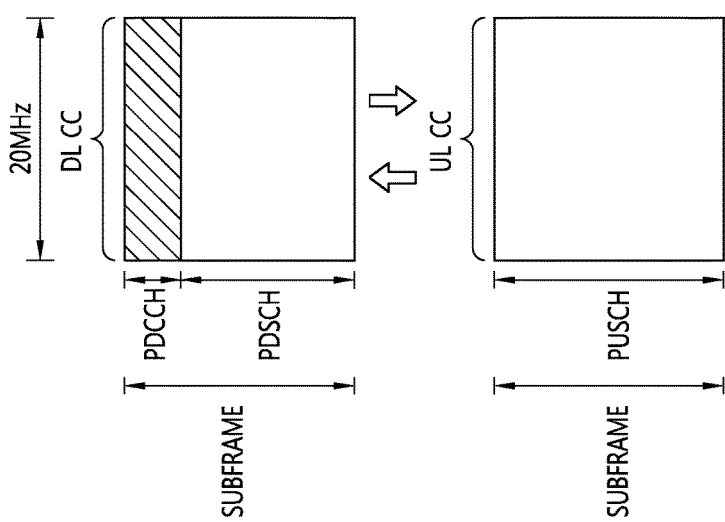

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
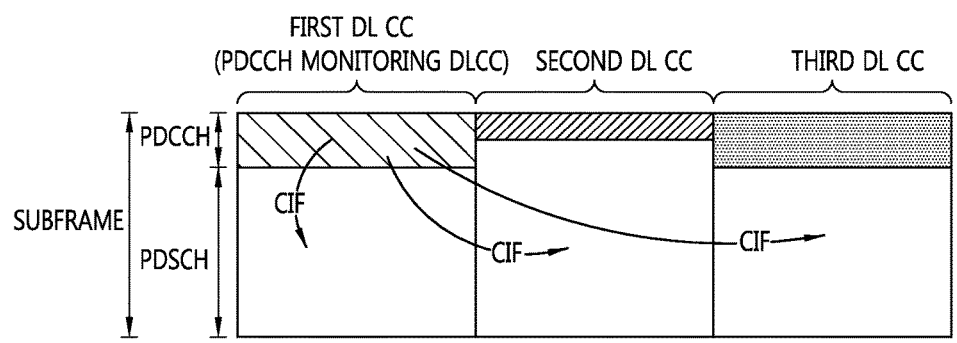
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
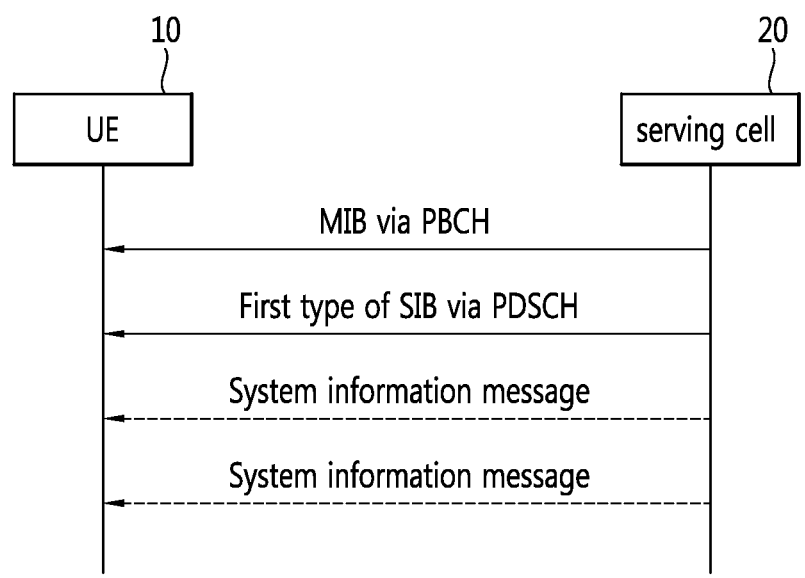
FIG. 9 illustrates an example of transmitting system information.

FIG. 9 illustrates an example of transmitting system information.

System information is classified into a master information block (MIB) and a plurality of system information blocks (SIB). The MIB includes the most important physical layer information on a cell. The SIBs includes different types. A first type of SIB includes information used to evaluate whether a UE is allowed to access a cell and scheduling information on another type of SIB. A second type of SIB (SIB type 2) includes information on common and shared channels. A third type of SIB (SIB type 3) includes cell reselection information related mostly to a serving cell. A fourth type of SIB (SIB type 4) includes frequency information on a serving cell and intra-frequency information on a neighbor cell related to cell reselection. A fifth type of SIB (SIB type 5) includes information on another E-UTRA frequency and inter-frequency information on a neighbor cell related to cell reselection. A sixth type of SIB (SIB type 6) includes information on a UTRA frequency and information on a UTRA neighbor cell related to cell reselection. A seventh type of SIB (SIB type 7) includes information on a GERAN frequency related to cell reselection.

As shown in FIG. 9, the MIB is transmitted to a UE 10 via a PBCH. The first type of SIB (SIB type 1) is mapped to a DL-SCH and transmitted to the UE 10 via a PDSCH. Other types of SIBs are transmitted to the UE via a PDSCH through a system information message.

Hereinafter, MTC will be described.

Figure 10A:
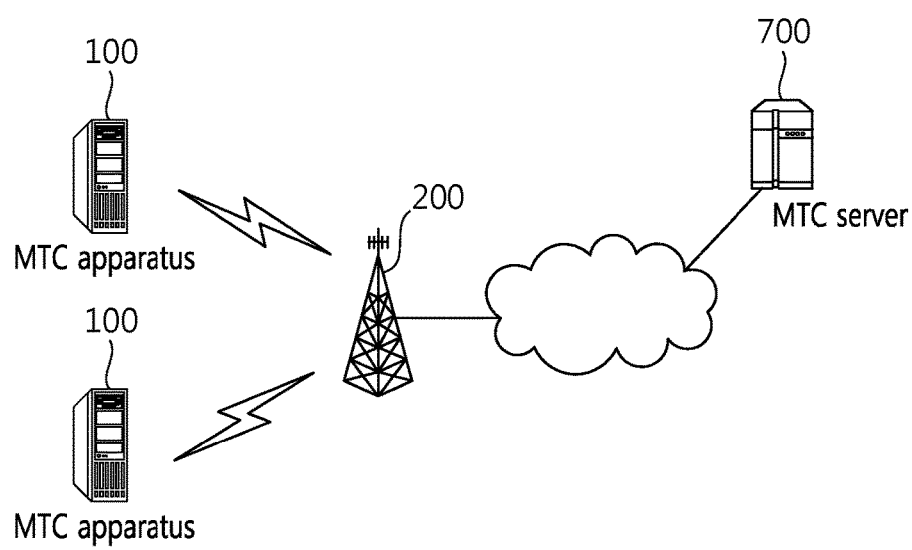
FIG. 10*a* illustrates an example of machine-type communication (MTC).

FIG. 10a illustrates an example of machine type communication (MTC).

The MTC refers to information exchange performed between MTC apparatuses 100 via a BS 200 without human interactions or information exchange performed between the MTC apparatus 100 and an MTC server 700 via the BS.

The MTC server 700 is an entity for communicating with the MTC apparatus 100. The MTC server 700 executes an MTC application, and provides an MTC-specific service to the MTC apparatus.

The MTC apparatus 100 is a wireless device for providing the MTC, and may be fixed or mobile.

A service provided using the MTC is differentiated from an existing communication service requiring human intervention, and its service range is various, such as tracking, metering, payment, medical field services, remote controlling, etc. More specifically, examples of the service provided using the MTC may include reading a meter, measuring a water level, utilizing a surveillance camera, inventory reporting of a vending machine, etc.

The MTC apparatus is characterized in that a transmission data amount is small and uplink/downlink data transmission/reception occurs sometimes. Therefore, it is effective to decrease a unit cost of the MTC apparatus and to decrease battery consumption according to a low data transmission rate. The MTC apparatus is characterized of having a small mobility, and thus is characterized in that a channel environment does almost not change.

Figure 10B:
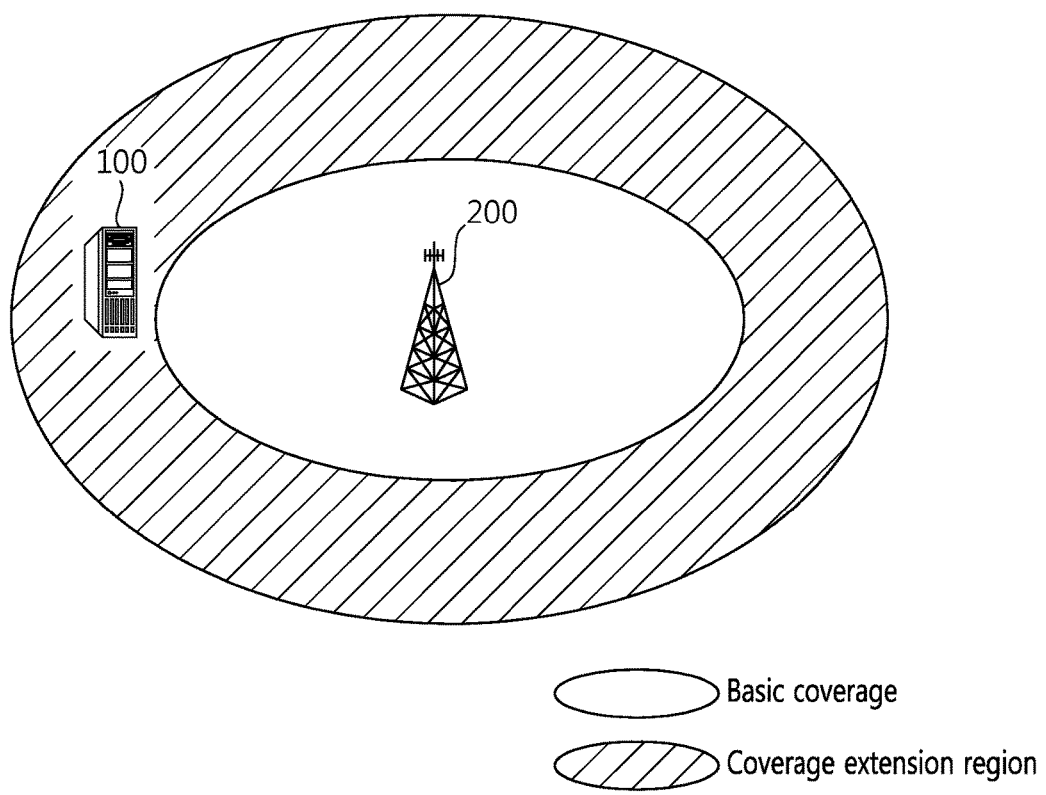
FIG. 10*b* illustrates an example of cell coverage extension for an MTC apparatus.

FIG. 10b illustrates an example of cell coverage extension for an MTC apparatus.

Recently, it is considered to extend cell coverage of a BS for an MTC apparatus 100, and various schemes for extending the cell coverage are under discussion.

However, when the cell coverage is extended, if the BS transmits a PDSCH and a PDCCH including scheduling information for the PDSCH to the MTC apparatus located in the coverage extension region as if it is transmitted to a normal UE, the MTC apparatus has a difficulty in receiving them.

EMBODIMENTS OF THE PRESENT INVENTION

Thus, embodiments of the present invention are provided to solve the foregoing problem.

According to an embodiment of the present invention, to solve the foregoing problem, when a BS transmits a PDSCH and PDCCH to an MTC apparatus located in a coverage extension region, the BS repeatedly transmits the PDSCH and PDCCH on a plurality of subframes (for example, a bundle of subframes). Thus, the MTC apparatus receives a bundle of PDCCHs through the plurality of subframes and decode the bundle of PDCCHs, thereby increasing decoding success rate. That is, a PDCCH may be successfully decoded using a portion or all of the PDCCHs in the bundle received through a plurality of subframes. Likewise, the MTC apparatus receives a bundle of PDSCHs through a plurality of subframes and decodes a portion or all of PDSCHs in the bundle, thereby increasing decoding success rate.

Similarly, the MTC apparatus located in the coverage extension region may transmit a bundle of PUCCHs through a plurality of subframes. Also, the MTC apparatus may transmit a bundle of PUSCHs through a plurality of subframes.

However, to repeatedly transmit PDSCHs and PDCCHs to the MTC apparatus located in the coverage extension region on a plurality of subframes in the presence of an existing UE in a cell, a very large quantity of resources may be used, causing damage to the existing UE.

Thus, a solution to such a problem will be described below. Hereinafter, for convenience of description, an MTC apparatus located in a coverage extension region is referred to as a coverage enhancement (CE) MTC apparatus, and an MTC apparatus located out of the coverage extension region as a non-CE MTC apparatus.

According to an embodiment of the present invention to overcome the foregoing problem, time division multiplexing (TDM) may be used such that a CE MTC apparatus and a non-CE MTC apparatus alternately operate in a time-divided manner in order to prevent an operation of a BS for the CE MTC apparatus from causing damage to an existing UE or the non-CE MTC apparatus. TDM may be a based on a long-term period in tens of minutes or a short-tem period in subframes.

Here, according to an embodiment, the BS in a cell may transmit downlink data to the CE MTC apparatus on a multicast-broadcast single-frequency network (MBSFN) subframe and transmit downlink data to the non-CE MTC apparatus on a general subframe (that is, non-MBSFN subframe) other than the MBSFN subframe.

Hereinafter, embodiments of the present invention will be described in detail.

(A) Subframes for CE MTC Apparatus

Figure 11:
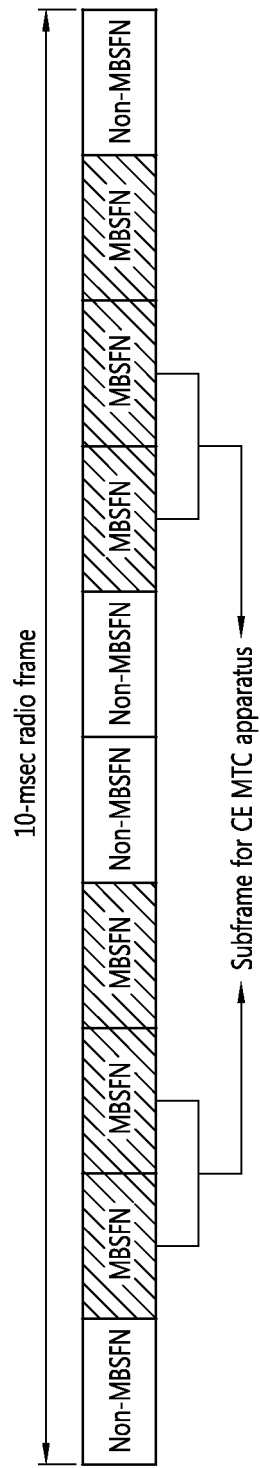
FIG. 11 illustrates an example of a subframe for an MTC apparatus located in a coverage extension region to receive downlink data.

As shown in FIG. 11, a 10-msec radio frame may be divided into MBSFN subframes and non-MBSFN subframes. Generally, an MTC apparatus or UE may receive an SIB from a BS in a cell to identify the positions of MBSFN subframes of the cell.

Defining a subframe for the BS in the cell to transmit downlink data to a CE MTC apparatus as a CE MTC subframe, the CE MTC subframe may always be the same as an MBSFN subframe for the BS in the cell to provide an existing normal UE with a service. Thus, when the CE MTC apparatus obtains information on the position of an MBSFN subframe from the BS, the MBSFN subframe may be assumed as a CE MTC subframe. The CE MTC subframe may include not only the MBSFN subframe but also a non-MBSFN subframe or may include non-MBSFN subframes only.

Meanwhile, the CE MTC apparatus may also receive a control channel/data channel and a reference signal (RS) on a non-MBSFN subframe, and also additionally on a CE MTC subframe. Specifically, the CE MTC apparatus may receive a cell-specific or cell-common control channel/data channel on a non-MBSFN subframe and receive a UE-specific control channel/data channel on a CE MTC subframe (or MBSFN subframe). Here, as described above, when the CE MTC subframe includes the non-MBSFN subframes only, the CE MTC apparatus may receive an individual UE-specific control channel/data channel on the non-MBSFN subframes.

Meanwhile, according to an embodiment, in order that the serving cell of the CE MTC apparatus can also support Multimedia Broadcast Multicast Services (MBMS), CE MTC subframes may include all or a portion of MBSFN subframes. For example, as shown in FIG. 11, MBSFN subframes may include subframes 1, 2, 3, 6, 7, and 8, while CE MTC subframes for the CE MTC apparatus to receive data may include subframes 1, 2, 6, and 7 only.

In this case, the BS of the cell may notify the existing normal UE or the CE MTC apparatus which subframes among the MBSFN subframes are used as CE MTC subframes, separately from the positions of the MBSFN subframes. Information on the positions of the CE MTC subframes may be transmitted to the CE MTC apparatus through an MIB or SIB. Here, the information on the positions of the CE MTC subframes may be represented in a 10-bit bitmap format indicating subframes used as the CE MTC subframes among 10 subframes in the 10-msec radio frame. Alternatively, the information on the positions of the CE MTC subframes may be represented in an M-bit bitmap format indicating subframes used as the CE MTC subframes among M MBSFN subframes in the 10-msec radio frame.

As such, even when a subframe region for transmitting downlink data for the CE MTC apparatus includes all or a portion of the MBSFN subframes, the MTC apparatus may assume that the positions of the CE MTC subrames are the same as the positions of the MBSFN subframes until the BS notifies the MTC apparatus of the positions of the CE MTC subframes. Alternatively, the MTC apparatus may assume that the CE MTC subframes including all or a portion of the MBSFN subframe are always in a fixed subframe region.

Thus, the CE MTC apparatus may use all or a portion of the MBSFN subframes as CE MTC subframes only in the presence of one or more MBSFN subframes assigned by the BS.

(B) Transmission of Downlink Data on CE MTC Subframe

When a BS of a cell transmits downlink data for a CE MTC apparatus on all or a portion of MBSFN subframes, a general PDSCH or EPDCCH may be transmitted on the corresponding MBSFN subframes, other than a physical multicast channel (PMCH) on a non-MBSFN subframe.

When the BS of the cell transmits the downlink data for the CE MTC apparatus on all or a portion of the MBSFN subframes, a PDCCH may be transmitted only on up to two OFDM symbols as in the MBSFN subframes even though a PDSCH may be transmitted on all available OFDM symbols in the corresponding MBSFN subframes. This is because an existing normal UE recognizes the corresponding subframes as general MBSFN subframes and thus recognizes that the BS of the cell transmits the PDCCH only on up to two OFDMs in the corresponding subframes.

Furthermore, when the BS of the cell transmits the downlink data for the CE MTC apparatus on all or a portion of the MBSFN subframes, a normal CP or extended CP is available in the entire symbol region of the corresponding subframes as in a non-MBSFN subframe.

In addition, when the BS of the cell transmits the downlink data for the CE MTC apparatus on all or a portion of the MBSFN subframes, not an MBSFN RS but a CRS may be transmitted in the corresponding subframes as in a non-MBSFN subframe.

Also, when the BS of the cell transmits the downlink data for the CE MTC apparatus on all or a portion of the MBSFN subframes, a separate transmission mode (TM) from a TM used for a non-MBSFN subframe may be used for the corresponding subframes. Here, TM2 may always be used as the TM used for the CE MTC subframes. Alternatively, the BS may notify the MTC apparatus of the TM used for the CE MTC subframes through an MIB, an SIB, or the like.

(C) Transmission of CRS on CE MTC Subframe

When a BS of a cell transmits downlink data for a CE MTC apparatus on all or a portion of MBSFN subframes, a CRS transmitted on these subframes may have a different form from that of a CRS transmitted on a general downlink subframe. That is, when the CE MTC apparatus is assigned one or more MBSFN subframes or a set of MBSFN subframes by the BS, the CE MTC apparatus may assume that the CRS is transmitted from the BS of the cell in the assigned subframes and frequency/sub-band. The CE MTC apparatus capable of making this assumption may not support a particular TM performing demodulation with a DM-RS, for example, TM8, TM9, and TM10.

Meanwhile, a current LTE-A system considers a technique of improving channel estimation performance of a normal UE by performing transmission power boosting of a CRS. For transmission power boosting of a CRS, a CRS is not transmitted in a portion of REs or RBs where a CRS is conventionally transmitted but a remaining CRS may be transmitted with greater power.

In an embodiment, by using this technique, the BS may transmit a CRS only in a portion of physical resource blocks (PRBs) in the entire system band, that is, all PRBs, on CE MTC subframes including all or a portion of MBSFN subframes. Specifically, techniques of transmitting a CRS only in a portion of PRBs on CE MTC subframes including all or a portion of MBSFN subframes may be as follows in i to iii.

i) A CRS may be transmitted only on six intermediate PRBs in the entire system band. Specifically, the CRS may be transmitted only on six intermediate PRBs or a designated sub-band on CE MTC subframes including all or a portion of MBSFN subframes. Here, the CRS may be transmitted with boosted power. More specifically, transmission power for the CRS may be boosted by the number of all PRBs in the system band/the number of PRBs in the sub-band times as compared with conventional transmission power.

ii) Defining the number of PRBs in the system band as PRB_S, a CRS may be transmitted only on ½*PRB_S intermediate PRBs. Specifically, the CRS may be transmitted only on six intermediate PRBs in CE MTC subframes including all or a portion of MBSFN subframes. Here, the CRS may be transmitted with boosted power. Specifically, transmission power for the CRS may be boosted by two times as compared with conventional transmission power.

iii) A CRS may be transmitted only through even-numbered or odd-numbered PRBs. More specifically, the CRS may be transmitted only on even-numbered or odd-numbered PRBs in CE MTC subframes including all or a portion of MBSFN subframes. Here, the CRS may be transmitted with boosted power. Specifically, transmission power for the CRS may be boosted by two times as compared with conventional transmission power.

According to the foregoing techniques, a CRS is not transmitted on all REs in a PRB set not to transmit a CRS. Instead, zero power transmission may be performed or a PDCCH/EPDCCH/PDSCH may be transmitted on an RE position in the PRB originally for transmitting a CRS. That is, a PDCCH/EPDCCH/PDSCH may be transmitted or zero power transmission may be performed in the position for transmitting a CRS. More specifically, zero power transmission may be performed in a position for transmitting a CRS in an OFDM symbol/PRB region where a PDCCH or EPDCCH is transmitted. Alternatively, a PDSCH may be transmitted via rate-matching in a position originally for transmitting a CRS in an OFDM symbol/PRB region where a PDSCH is transmitted. To protect an existing UE, transmission power boosting for a CRS may be performed in REs other than the PDCCH region. For example, it may be assumed that a CRS is transmitted as conventionally transmitted in the entire system bandwidth on first three OFDM symbols and a CRS is transmitted with preset increased power in other regions. It may be assumed that when this technique is used, the existing UE does not perform QAM transmission. Thus, it is not needed to separately set a power ratio of a PDSCH to a CRS. When a non-MBSFN subframe is assigned for the CE MTC apparatus and transmission power is increased as mentioned above, the BS sets, for the existing UE, this subframe as an MBSFN subframe so that the existing UE may not receive a CRS transmitted by the BS with boosted power. That is, for the existing UE, it may be assumed that transmission power boosting for a CRS occurs only on an MBSFN subframe or an existing UE-DRX subframe. A detailed description will be made with reference to FIG. 12.

Figure 12:
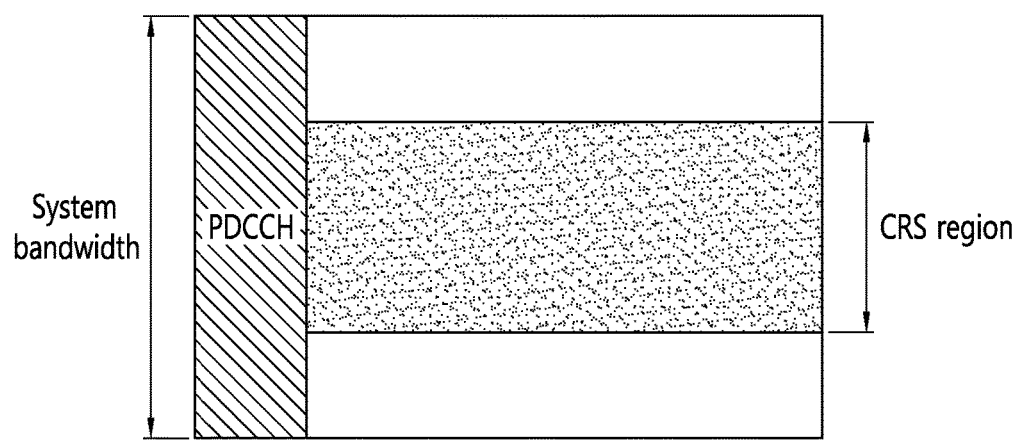
FIG. 12 illustrates an example of a region where a CRS for an MTC apparatus located in a coverage extension region is transmitted.

As shown in FIG. 12, a CRS may be transmitted in the entire system bandwidth, as conventionally transmitted, in a PDCCH region on CE MTC subframes including all or a portion of subframes, and a CRS may be transmitted only in a portion of PRBs in the entire system band only in an OFDM symbol region where a PDSCH/EPDCCH for the CE MTC apparatus is transmitted. When the CRS is transmitted only in the portion of the PRBs on the OFDM symbols where the PDSCH/EPDCCH is transmitted, the same techniques as mentioned above may be applied.

(D) Transmission of Cell-Specific Data on Subframe for CE MTC Apparatus

When a BS transmits downlink data for a CE MTC apparatus on all or a portion of MBSFN subframes, cell-specific or cell-common data (for example, the first type of SIB and the second type of SIB) for the CE MTC apparatus may also be transmitted on the CE MTC subframes. In this case, the BS may transmit the cell-specific or cell-common data using two methods. According to a first method, the BS may transmit the cell-specific or cell-common data for the CE MTC apparatus separately from cell-specific or cell-common for an existing UE. To this end, the BS may use different RNTIs. According to a second method, the BS may transmit the cell-specific or cell-common data for the existing UE using a general method, and repeatedly transmit the cell-specific or cell-common data for a CE MTC apparatus located in a coverage extension region through subframes set for the CE MTC apparatus.

According to the above two methods, the CE MTC apparatus needs to assume that the first type of SIB can be received on CE MTC subframes as a portion of subframes conventionally known not to receive the first type of SIB through.

Assuming that the cell-specific or cell-common data is transmitted in the CE MTC subframes, the MTC apparatus may assume that the cell-specific or cell-common data is received always on a particular subframe among the CE MTC subframes. For example, when six subframes in a 10-msec radio frame are set as CE MTC subframes, it may be assumed that a cell-specific PDSCH is always received on a first subframe among the six frames.

Alternatively, the MTC apparatus may assume that the first type of SIB is received always on a particular subframe of the CE MTC subframes. When particular subframes for receiving cell-specific data are a subset of the CE MTC subframes, only the subframes may be used as a PDCCH for the cell-specific data and/or a bundle of PDSCHs including the cell-specific data. More specifically, when a set of the subframes is determined, it may be assumed that a PDCCH including scheduling information on user-specific data or a PDSCH including user-specific data may not be transmitted on the subframes.

Meanwhile, when the BS transmits the downlink data for the CE MTC apparatus on all or a portion of MBSFN subframes, only a UE-specific search space (USS) may always be included in a (E)PDCCH transmitted on the subframes. That is, the CE MTC apparatus may assume that only the USS is present in the CE MTC subframes and thus only user-specific data may be received on the subframes set for the CE MTC apparatus. In this case, the CE MTC apparatus may receive cell-specific or cell-common data only on subframes for the existing UE. In addition, the MTC apparatus may assume that only a CSS is received on a non-MBSFN subframe.

(E) Transmission of PDSCH on CE MTC Subframe

When a BS transmits downlink data for a CE MTC apparatus on all or a portion of MBSFN subframes, a PRB region for transmitting a PDSCH among PRBs in the subframes may be different from a PRB region for transmitting a PDSCH on a general downlink subframe.

Figure 13:
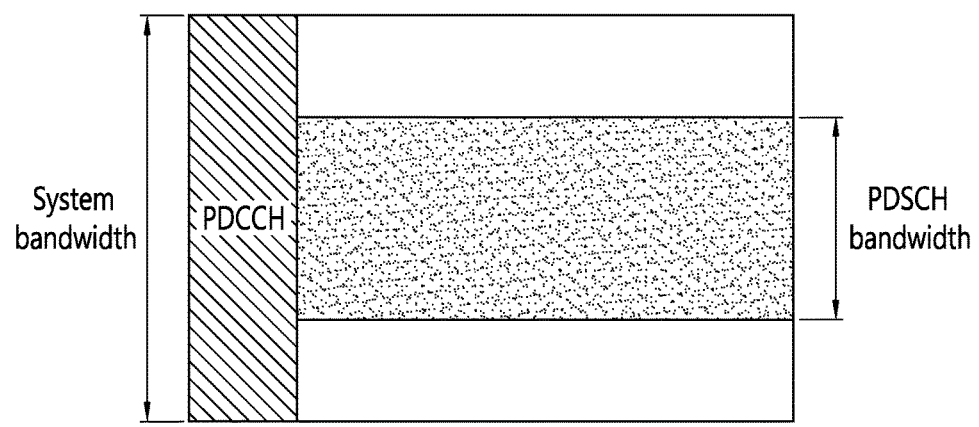
FIG. 13 illustrates an example of a region where a PDSCH for an MTC apparatus located in a coverage extension region is transmitted.

As shown in FIG. 13, the BS may transmit a PDSCH for the CE MTC apparatus only through a portion of the entire downlink system bandwidth. For example, a PDSCH bandwidth may have a size a half times the size of the entire system bandwidth. In this case, a PRB region for transmitting a PDSCH may be a PRB region as large as a central PDSCH band. When the PDSCH is transmitted in the PRB region, the PDSCH may be transmitted with greater power than transmitted in a non-MBSFN subframe. For example, a PDSCH may be transmitted with two times greater power per RE on a CE MTC subframe than a PDSCH on a non-MBSFN subframe.

(F) Transmission of ACK/NACK of CE MTC Subframe

Hereinafter, suppose a situation where when CE MTC subframes are always the same as MBSFN subframes or are all or a portion of the MBSFN subframes, a CE MTC apparatus receives a user-specific control channel/data channel only on the CE MTC subframes (or MBSFN subframes).

Here, when $N_D$ CE MTC subframes are present in a 10-msec radio frame, the positions of the CE MTC subframes may be represented by $D_i$. Here, i may be 0, 1, . . . , $N_D$. Here, the positions of subframes for the CE MTC apparatus to transmit an ACK/NACK of a user-specific data channel may be determined according to the positions of CE MTC subframes for receiving a user-specific data channel in each 10-msec radio frame.

In FDD, the position of a subframe for the CE MTC to transmit an ACK/NACK may be $D_i+4$.

In TDD, defining the number of subframes for the CE MTC apparatus to transmit an ACK/NACK in each 10-msec radio frame as $N_A$, the position of the subframes for the CE MTC apparatus to transmit an ACK/NACK in the 10-msec radio frame may be determined as $(D_i+G_i)$ mod 10. Here, i may be 0, 1, . . . , $N_D$. $G_i$ for determining the positions of subframes for a CE MTC UE to transmit an ACK/NACK according to the position of the CE MTC subframe may be determined as follows in Table 2. Table 2 illustrates $G_i$ according to the position $D_i$ of a CE MTC subframe in each TDD UL-DL configuration.

TABLE 2

| UL-DL configuration | Di | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

For example, when TDD UL-DL configuration 2 shown in Table 1 is used and the positions of CE MTC subframes are 3, 4, 8, and 9, the position of a subframe for the CE MTC apparatus to transmit an ACK/NACK may be calculated as follows. First, the positions of the CE MTC subframes may be expressed as $D_1=3$, $D_2=4$, $D_3=8$, and $D_4=9$. Since UL-DL configuration 2 is used, $G_i$ is obtained from Table 2 such that $G_1=4$, $G_2=8$, $G_3=4$, and $G_4=8$. The positions of subframes for transmitting an ACK/NACK are $(D_1+G_1)$ mod $10=7$, $(D_2+G_2)$ mod $10=2$, $(D_3+G_3)$ mod $10=2$, and $(D_4+G_4)$ mod $10=7$. Accordingly, the positions of subframes for the CE MTC apparatus to transmit an ACK/NACK are subframe 2 and subframe 7. Thus, the MTC apparatus may repeatedly transmit an ACK/NACK through subframe 2 and subframe 7 from a subframe for starting to transmit an ACK/NACK after reception of PDSCHs is finished.

There may be another method for transmitting ACK/NACK information on a bundle of PDSCHs on a plurality of subframes after the CE MTC apparatus receives the bundle of PDSCHs on CE MTC subframes in the TDD environment. Specifically, when the CE MTC apparatus finishes receiving the bundle of PDSCHs in 'subframe n,' the CE MTC apparatus may transmit an ACK/NACK on a plurality of subframes (that is, $N_A$ subframes) from 'subframe n+G.' More specifically, the CE MTC apparatus may transmit an ACK/NACK of the PDSCHs on 'subframes n+G*a.' Here, a may be $0, 1, \ldots, N_A$. Here, G may be determined according to Table 2. G and D correspond to $G_i$ and $D_i$ in Table 2, respectively.

(G) PUSCH Transmission Subframe Corresponding to CE MTC Subframe

Hereinafter, suppose a situation where when CE MTC subframes are always the same as MBSFN subframes or are all or a portion of the MBSFN subframes, a CE MTC apparatus receives a user-specific control channel/data channel only on the CE MTC subframes (or MBSFN subframes).

Here, when $N_D$ CE MTC subframes are present in a 10-msec radio frame, the positions of the CE MTC subframes may be represented by $D_i$. Here, i may be $0, 1, \ldots, N_D$. Here, the positions of subframes for the CE MTC apparatus to transmit a PUSCH may be determined according to the positions of CE MTC subframes for receiving a user-specific control channel in each 10-msec radio frame.

In FDD, the position of a subframe for the CE MTC to transmit a PUSCH may be $D_i+4$.

In TDD, defining the number of subframes for the CE MTC apparatus to transmit a PUSCH in each 10-msec radio frame as $N_U$, the position of a subframe for the CE MTC apparatus to transmit a PUSCH in each 10-msec radio frame may be determined as $(D_i+K_i)$ mod 10. Here, i may be $0, 1, \ldots, N_D$.

$K_i$ may be determined according to Table 3. Table 3 illustrates illustrates $K_i$ according to the position of a CE MTC subframe $D_i$ in each UL-DL configuration.

TABLE 3

| TDD UL-DL configuration | Di | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

However, when a subframe $D_i$ for receiving an uplink grant from the BS is not a subframe illustrated in Table 4 but a different subframe, the MTC apparatus may exclude the subframe in determining a subframe for transmitting a PUSCH.

TABLE 4

| TDD UL-DL configuration | Subframe for receiving uplink grant |
|---|---|
| 0 | 0, 1, 5, 6 |
| 1 | 1, 4, 6, 9 |
| 2 | 3, 8 |
| 3 | 0, 8, 9 |
| 4 | 8, 9 |
| 5 | 8 |
| 6 | 0, 1, 5, 6, 9 |

For example, when TDD UL-DL configuration 1 is used and the positions of CE MTC subframes are 1, 4, and 6, the position of a subframe for transmitting a PUSCH may be calculated as follows. First, the positions of the CE MTC subframes may be expressed as $D_1=1$, $D_2=4$, and $D_3=6$. Since UL-DL configuration 1 is used, $K_i$ is obtained from Table 3 such that $K_1=6$, $K_2=4$, and $K_3=6$. The positions of subframes for transmitting a PUSCH are $(C_1+K_1)$ mod $10=7$, $(C_2+K_2)$ mod $10=8$, and $(C_3+K_3)$ mod $10=2$. Accordingly, the positions of subframes for the CE MTC apparatus to transmit a PUSCH after receiving a PDCCH including an uplink grant are subframes 2, 7, and 8. Consequently, a bundle of PUSCHs are transmitted on subframes 2, 7, and 8.

(H) Transmission of PBCH on CE MTC Subframe

A BS may also repeatedly transmit a PBCH for a CE MTC apparatus on a plurality of subframes, which will be described in detail with reference to FIG. 14.

Figure 14A:
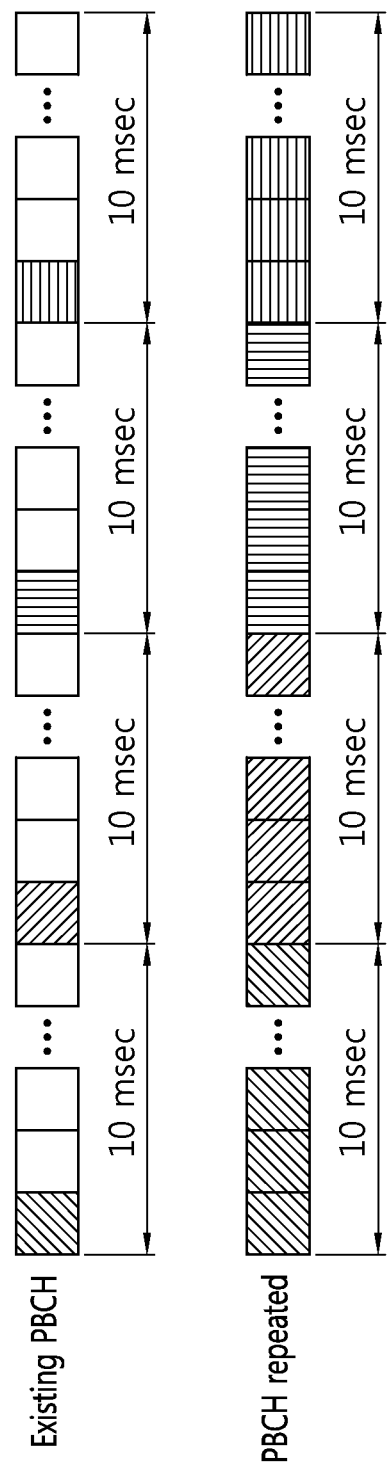
FIGS. 14*a* and 14*b* illustrate an example of repeatedly transmitting a bundle of PBCHs for an MTC apparatus located in a coverage extension region.

As shown in FIG. 14a, an existing PBCH is transmitted on subframes 0, 10, 20, and 30 for 40 msec, while a bundle of PBCHs repeatedly transmitted on a plurality of subframes according to an embodiment of the present invention may be transmitted on all of the subframes for 40 msec. As such, an existing PBCH is transmitted once for 10 msec, while the embodiment may transmit a bundle of PBCHs on a plurality of subframes for an MTC apparatus located in a coverage extension region.

Figure 14B:
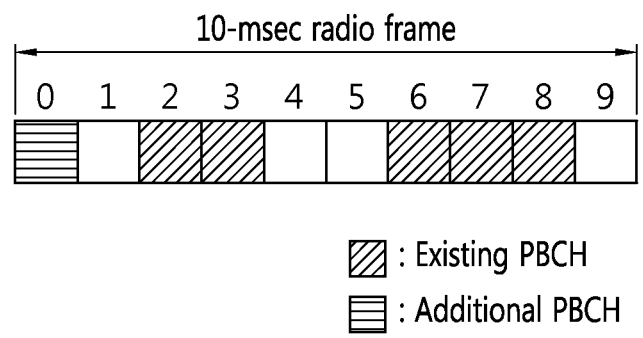

However, considering the resource region of an existing normal UE or the like, as shown in FIG. 14b, a PBCH may be repeatedly transmitted only on a portion of subframes in a 10-msec radio frame.

Here, subframes for transmitting a bundle of PBCHs for the CE MTC apparatus, for example, subframes 0, 2, 3, 6, 7, and 8 in FIG. 14b, may be the same as CE MTC subframes as a subframe region for transmitting downlink data for the CE MTC. Alternatively, subframes for transmitting a bundle of PBCHs for a CE MTC UE except for subframe 0, for example, subframes 2, 3, 6, 7, and 8 in FIG. 14b, may be the same as CE MTC subframes as a subframe region for transmitting downlink data for the CE MTC apparatus. Alternatively, a bundle of PBCHs for the CE MTC apparatus except for a PBCH transmitted on subframe 0 may be transmitted only on all or a portion of MBSFN subframes.

Here, although the BS of a particular cell uses two or more antenna ports, the CE MTC UE does not need high data transmission rate or operates in a low SNR region and thus may not have good channel estimation performance enough to use two or more RS antenna ports. Further, since the MTC apparatus has low portability and thus may have a channel environment with a considerably low diversity. Thus, it may be inefficient for the BS of the cell to transmit data to the MTC using a plurality of antenna ports.

Thus, according to the embodiment, regardless of the number of antenna ports used for an existing PBCH and CRS transmitted through subframe 0, the number of antennas used to transmit a bundle of additional PBCHs for the CE MTC apparatus may not be increased but be reduced in a resource region for transmitting the bundle of additional PBCHs (that is, subframes or CE MTC subframes for transmitting the bundle of PBCHs). More specifically, regardless of the number of antenna ports used for an existing PBCH and CRS transmitted on subframe 0, only one antenna port may be used to transmit a bundle of additional PBCHs for the CE MTC apparatus and a CRS in a resource region for transmitting the bundle of additional PBCHs for the CE MTC apparatus (that is, subframes or CE MTC subframes for transmitting the bundle of PBCHs). Here, the antenna port may be antenna port 0.

Further, according to the embodiment, regardless of the number of antenna ports used for an existing PBCH and CRS transmitted through subframe 0, the number of antenna ports used to transmit a PDSCH and CRS to the CE MTC apparatus on a CE MTC subframe (or in a time/frequency resource region for transmitting a PDSCH for the CE MTC apparatus) may be limited. Specifically, regardless of the number of antenna ports used for an existing PBCH and CRS transmitted on subframe 0, only one antenna port may be used to transmit a PDSCH and CRS to the CE MTC apparatus on a CE MTC subframe. Here, the antenna port may be antenna port 0.

Great-performance channel estimation is a very important element for a MTC apparatus located in a coverage extension region. One method for improving channel estimation performance of such an MTC apparatus is enhancing the density of RSs used for channel estimation.

To this end, according to the embodiment, regardless of the number of antenna ports used for an existing PBCH and CRS, the number of antenna ports used to transmit a bundle of additional PBCHs and/or a PDSCH only for the CE MTC apparatus in a subframe (for example, CE MTC subframe) or in a time/frequency resource region for transmitting the bundle of additional PBCHs and/or the PDSCH may be limited. Specifically, it is suggested to transmit, through antenna ports used to transmit a bundle of PBCHs and/or data for the CE MTC apparatus, a CRS transmitted through other antenna ports than antenna ports for transmitting the bundle of additional PBCHs and/or a PDSCH for the CE MTC apparatus among antenna ports used to transmit an existing PBCH and CRS.

Figure 15:
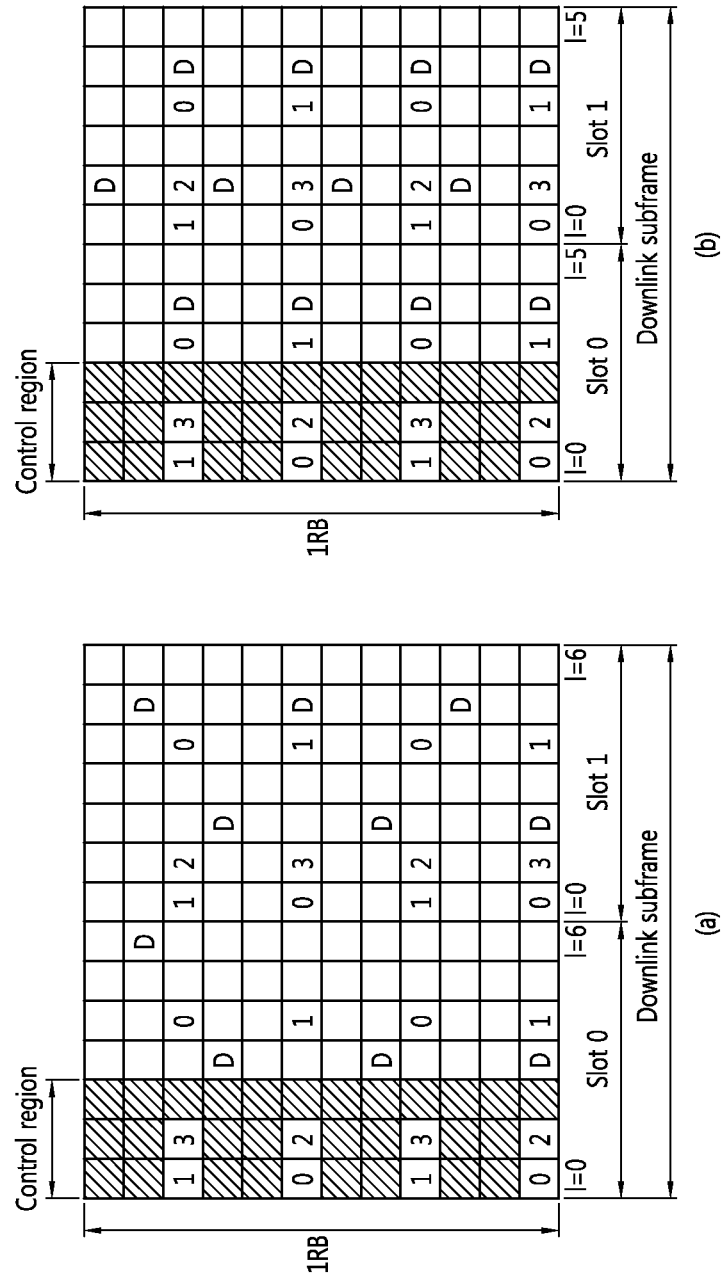
FIG. 15 illustrates an example of a resource for transmitting a CRS.

For example, when existing PBCHs and CRSs are transmitted through antenna ports 0, 1, 2, and 3 and only antenna port 0 is used to transmit a bundle of additional PBCHs and/or PDSCHs for the CE MTC apparatus in a CE MTC subframe or a time/frequency resource region for transmitting the bundle of additional PCBHs and/or PDSCHs for the CE MTC apparatus, it is suggested to transmit, through antenna port 0, a CRS which need transmitting through antenna ports 1, 2, and 3, which will be described in detail with reference to FIG. 15.

FIG. 15 illustrates an example of a resource for transmitting a CRS.

In (a) and (b) of FIG. 15, numbers indicated in REs represent antenna port numbers. (a) of FIG. 15 illustrates an example of transmitting a CRS on a radio resource grid using a normal CP, and (b) of FIG. 15 illustrates an example of transmitting a CRS on a radio resource grid using an extended CP. As shown in (a) and (b) of FIG. 15, when an existing CRS is transmitted on REs represented by antenna ports 0, 1, 2, and 3, a CRS which needs transmitting on REs represented by antenna ports 0, 1, 2, and 3 may be transmitted using antenna port 0 in a CE MTC subframe or a time/frequency resource region for transmitting a bundle of additional PBCHs and/or PDSCHs for the CE MTC apparatus. In this case, the number of REs for CRSs transmitted on antenna port 0 is increased. Further, in the corresponding region, only antenna port 0 may be used to transmit a bundle of PBCHs and/or PDSCHs to the CE MTC apparatus.

The aforementioned embodiments of the present invention can be implemented through various means. For example, the embodiments of the present invention can be implemented in hardware, firmware, software, combination of them, etc. Details thereof will be described with reference to the drawing.

Figure 16:
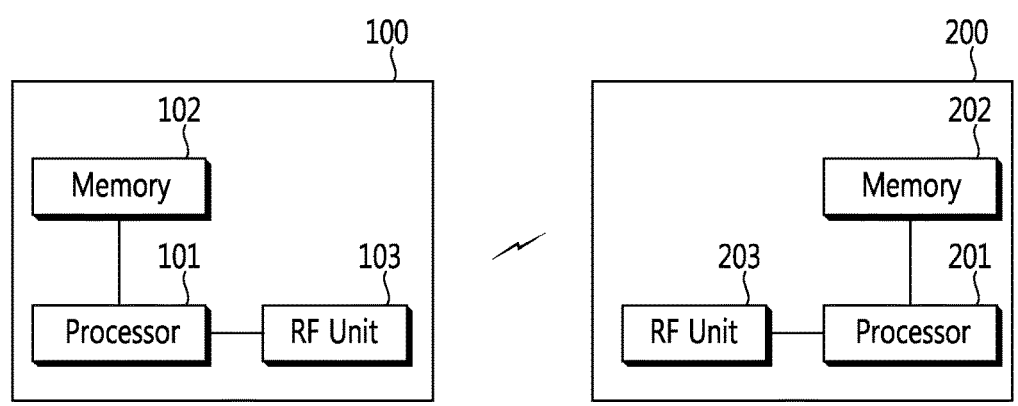
FIG. 16 is a block diagram illustrating a wireless communication system according to an embodiment of the present invention.

FIG. 16 is a block diagram illustrating a wireless communication system according to an embodiment of the present invention.

The base station (BS) 200/300 includes processor 201/301, memory 202/302, and radio frequency (RF) unit 203/303. The memory 202/302 coupled with the processor 201/301 stores a variety of information for driving the processor 201/301. The RF unit 203/303 coupled to the processor 201/301 transmits and/or receive radio signals. The processor 201/301 implements the proposed functions, procedures, and/or methods. In the aforementioned embodiment, an operation of the BS may be implemented by the processor 201/301.

The MTC apparatus 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving a signal of a first physical downlink shared channel (PDSCH), the method performed by a wireless device and comprising:

receiving first information specifying a plurality of subframes used for the wireless device;

receiving second information specifying at least one multimedia broadcast multicast service single frequency network (MBSFN) subframe;

determining multiple downlink subframes, to receive the signal of the first PDSCH, based on the plurality of subframes specified in the first information, wherein the multiple downlink subframes include at least one MBSFN subframe specified by the second information;

receiving the signal of the first PDSCH which is repeated over the determined multiple downlink subframes; and if the signal of the first PDSCH includes a first system information block (SIB), determining that a signal of a second PDSCH including a data other than the first SIB is not transmitted in the determined multiple downlink subframes, wherein the first SIB is dedicated for the wireless device and different from a SIB for a user equipment (UE) used by a user.

2. The method of claim 1, wherein the first information is received via a second SIB or a higher layer signal.

3. The method of claim 2, wherein the first information is expressed as a bitmap in the second SIB.

4. The method of claim 3, wherein the bitmap includes 10 bits.

5. The method of claim 1, wherein the second information is received via a second SIB.

6. A wireless device for receiving a signal of a first physical downlink shared channel (PDSCH), the wireless device comprising:
 a transceiver; and
 a processor operatively connected to the transceiver and configured to:
  control the transceiver to receive first information specifying a plurality of subframes used for the wireless device,
  control the transceiver to receive second information specifying at least one multimedia broadcast multicast service single frequency network (MBSFN) subframe,
  determine multiple downlink subframes, to receive the signal of the first PDSCH, based on the plurality of subframes specified in the first information,
  wherein the multiple downlink subframes include at least one MBSFN subframe specified by the second information,
  control the transceiver to receive the signal of the first PDSCH which is repeated over the determined multiple downlink subframes, and
  if the signal of the first PDSCH includes a first system information block (SIB), determine that a signal of a second PDSCH including a data other than the first SIB is not transmitted in the determined multiple downlink subframes,
  wherein the first SIB is dedicated for the wireless device and different from a SIB for a user equipment (UE) used by a user.

7. The wireless device of claim 6, wherein the first information is received via a second SIB or a higher layer signal.

8. The wireless device of claim 7, wherein the first information is expressed as a bitmap in the second SIB.

9. The wireless device of claim 8, wherein the bitmap includes 10 bits.

10. The wireless device of claim 6, wherein the second information is received via a second SIB.

* * * * *